US009000058B2

(12) United States Patent
Cervellati et al.

(10) Patent No.: US 9,000,058 B2
(45) Date of Patent: Apr. 7, 2015

(54) PROCESS FOR DEVULCANIZING VULCANIZED FLUOROELASTOMERS, FLUOROELASTOMERS THEREOF AND THEIR USE

(71) Applicants: Alessandro Cervellati, San Lazzaro di Savena (IT); Gian Tommaso Viola, Cervia (IT)

(72) Inventors: Alessandro Cervellati, San Lazzaro di Savena (IT); Gian Tommaso Viola, Cervia (IT)

(73) Assignee: Dott. Viola & Partners Chemical Research S.R.L., Bologna (IT)

( * ) Notice: Subject to any disclaimer, the term of this patent is extended or adjusted under 35 U.S.C. 154(b) by 0 days.

(21) Appl. No.: 14/376,602

(22) PCT Filed: Feb. 28, 2013

(86) PCT No.: PCT/IT2013/000061
§ 371 (c)(1),
(2) Date: Aug. 4, 2014

(87) PCT Pub. No.: WO2013/132523
PCT Pub. Date: Sep. 12, 2013

(65) Prior Publication Data
US 2014/0378562 A1  Dec. 25, 2014

(30) Foreign Application Priority Data
Mar. 6, 2012 (IT) ............... M12012A0339

(51) Int. Cl.
| C08J 11/04 | (2006.01) |
| C08J 11/14 | (2006.01) |
| C08J 11/24 | (2006.01) |
| C08L 17/00 | (2006.01) |
| C08L 27/12 | (2006.01) |
| B29C 43/00 | (2006.01) |
| B29C 45/00 | (2006.01) |
| B29C 47/00 | (2006.01) |
| C08J 3/24 | (2006.01) |
| C08L 27/22 | (2006.01) |
| C08J 9/00 | (2006.01) |
| B29K 27/12 | (2006.01) |
| B29L 7/00 | (2006.01) |
| B29L 31/26 | (2006.01) |

(52) U.S. Cl.
CPC ........ *C08J 11/14* (2013.01); *C08J 11/24* (2013.01); *C08L 17/00* (2013.01); *C08L 27/12* (2013.01); *C08J 2327/12* (2013.01); *C08L 2205/02* (2013.01); *B29C 43/003* (2013.01); *B29C 45/0001* (2013.01); *B29C 47/0004* (2013.01); *B29K 2027/12* (2013.01); *B29L 2007/00* (2013.01); *B29L 2031/265* (2013.01); *C08J 3/24* (2013.01); *C08L 27/22* (2013.01); *C08L 2207/20* (2013.01)

(58) Field of Classification Search
USPC .................. 521/46; 524/445; 264/175, 176.1
See application file for complete search history.

(56) References Cited

U.S. PATENT DOCUMENTS

| 3,972,842 A | 8/1976 | Markham |
| 6,416,705 B1 | 7/2002 | Dinzburg |

FOREIGN PATENT DOCUMENTS

| GB | 1144163 | 3/1969 |
| GB | 1405170 | 9/1975 |

*Primary Examiner* — Terressa Boykin
(74) *Attorney, Agent, or Firm* — Themis Law

(57) ABSTRACT

A process for devulcanizing fluoroelastomers having a fluorine content between 62% and 74% by weight vulcanized by ionic systems, preferably selected from bisphenol A and bisphenol AF, i.e. 2,2-bis(4-hydroxyphenyl)hexafluoropropane, the process including a step of heating the vulcanized fluoroelastomers in the presence of a hydrolysis composition having one or more chemical selected from water, water soluble alcohols, water soluble glycols and mixtures thereof, at a temperature from 350° C. to 430° C. Fluoroelastomers obtainable by this process and their use for the preparation of compounds and vulcanized compositions are also described.

16 Claims, No Drawings

PROCESS FOR DEVULCANIZING VULCANIZED FLUOROELASTOMERS, FLUOROELASTOMERS THEREOF AND THEIR USE

FIELD OF THE INVENTION

The present invention relates to a process for devulcanizing vulcanized fluoroelastomers, in particular vulcanized fluoroelastomer scraps, so obtaining non-vulcanized fluorocarbon polymer again reusable, totally or partially, for the preparation of compounds suitable for the production of articles having technological characteristics in accordance with the required specifications for different uses.

BACKGROUND OF THE INVENTION

As to the definition of "fluoroelastomers", see for example Albert L. Moore in *Fluoroelastomers Handbook—The Definitive User's Guide and Databook*, 2006 Publisher William Andrew Publishing/Plastics Design Library, ISBN: 978-O-8155-1517-3.

The term "vulcanized fluoroelastomers" relates to fluoroelastomers having cross-links between the fluoroelastomer polymers chains; said cross-links, obtained by reacting a non-vulcanized fluoroelastomer with a suitable vulcanizing agent possibly in presence of an accelerator, ensure for a long time the maintenance of the technological properties, such as dimensional stability of articles even submitted to compression forces at high temperature. Said cross-links are characterized by an important chemical stability, said stability allowing using fluoroelastomers even in severe conditions; therefore it is almost impossible to reclaim vulcanized fluoroelastomers by a selective breaking of said cross-links, even considering that extreme conditions can lead to a substantial degradation of the material and a loss of every elastomeric characteristic.

SUMMARY OF THE INVENTION

The present invention consists in a process for breaking said cross-links obtained by a set of reactions, the first one being a dehydrofluorination of a polymer chain in positions characterized by a particular monomer sequence and the second one being a vulcanization reaction obtained, as far as the present invention is concerned, by using either amines or polyphenols in the presence of basic salts.

Fluoroelastomers are mainly produced by copolymerisation, using an emulsion radical polymerization, of a few fluoromonomers, in particular vinylidene fluoride ($CF_2=CH_2$, named VDF), hexafluoropropene ($C_3F_6$, $CF_2=CF(CF_3)$ named HFP) and perfluorovinyl ethers ($CF_2=CF-OR_f$ where $R_f=CF_3-$, $CF_3-CF_2-$, in addition to superior homologouses, all named PMVE) and tetrafluoroethylene (TFE).

The co- and ter-polymers (besides a possible fourth functional co-monomer) obtained starting from said monomers can be subdivided into three groups.

The first copolymer group (Type 1) consists of copolymers VDF-HFP having fluorine content of 66±2% by weight; they can be vulcanized either using amine based systems, for example hexamethylene diamine carbamate and bis-cinnamilidene hexamethylene diamine, or, more generally, using chemicals having at least two hydroxyl groups, in particular bisphenols, for example 2,2-bis(4-hydroxyphenyl)hexafluoropropane, after a dehydrofluorination step using ammonium or phosphonium quaternary salts, for example benzyltriphenyl phosphonium chloride, in presence of basic salts. This group of copolymers, in particular those bisphenol vulcanized, shows an excellent combination between the thermal and long term mechanical resistance, the most important being the compression set, i.e. the irreversible percent deformation defined by ASTM D395-89. In particular these copolymers are useful for O-ring manufacture and, more generally, for seals resistant to aggressive fluids, solvents, oils and gasolines.

The second group of copolymers (Type 2) consists of ter-polymers VDF-HFP-TFE having fluorine content between 68% and 71% according to a greater or a smaller required resistance to solvents and to gasolines containing oxygenated chemicals. Also these ter-polymers can be vulcanized by bisphenol, but using a quantity of bisphenol and quaternary ammonium or phosphonium salts different from that of Type 1, for the reason that the polymer chain shows a smaller number of sites to be dehydrofluorinated.

As said before, these vulcanized compounds, useful for the manufacture of articles able to be in contact with fuel rich in oxygenated chemicals due to greater fluorine content, show a higher glass transition temperature, a lower thermal resistance and, in general, a lower compression set value compared with Type 1 copolymers. Type 2 copolymers can be vulcanized by peroxides too; in this case the polymers contain a fourth functionalized co-monomer in a quantity in the range from 1% to 3% by weight, said functionalization being normally made in the presence of bromine. The related vulcanized materials show a better chemical resistance compared with Type 1 copolymers, but a lower resistance to high temperature and a lower compression set value compared with bisphenol vulcanized compounds. When vulcanization by peroxides is carried out, the post-curing step, necessary in the case of polyphenol vulcanization, can be avoided.

The third group of copolymers (Type 3) consists of VDF-TFE-PMVE ter-polymers having fluorine content of 64±1%, usually peroxide vulcanized. This ter-polymer group shows very good low temperature properties, but lower high temperature resistance and lower compression set values compared with Type 1 copolymers. Also in this case, the post-curing step can be avoided.

From a technological point of view, the fluoroelastomers belonging to the above described groups are mainly characterized by the so-called "Mooney viscosity", expressed in Mooney units. Different Mooney viscosity values describe different polymer families that, the chemical composition being the same, are preferably used in different applications; for example in the case of compounds to be extruded, fluoroelastomers having a Mooney viscosity from 10 to 30 will be used, while for the manufacture of articles having selected mechanical properties fluoroelastomers having a Mooney viscosity greater than 50 will be preferred. Intermediate values (30-50) are mainly used for the manufacture of articles having average properties for the reason that they show a good compromise between flowing and mechanical properties. The Mooney viscosity, normally used and known in the rubber field, is not a true viscosity, but the number value of a torsional force moment measured as reported in ASTM D1646.

Then generally speaking the above described fluoroelastomers, in order to ensure getting the required physical characteristics and their maintenance in time, must be vulcanized using selected reagents suitable for producing a stable elastic network. Two kinds of vulcanizing agents, well known to skilled persons, are used; the first one is an ionic vulcanizing system, the second one is a peroxide vulcanizing system.

The process of the present invention relates to fluoroelastomers vulcanized by an ionic vulcanizing system using crosslinking agents selected between organic compounds having two hydroxyl groups and/or one or two amine groups in presence or in absence of selected accelerators or curing activators.

In this case the fluoroelastomer is submitted to a manufacture cycle comprising a step in which a quantity from 1 to 4.5 phr (parts per hundred parts of rubber) of a mixture of an accelerator and a crosslinking agent is added, the accelerator consisting of an organic compound having a positive charge (onium) and the crosslinking agent being a molecule having two hydroxyl radicals. If the vulcanizing agent is a chemical having two amine radicals, the accelerator consisting, as disclosed later on, of phosphonium or ammonium quaternary salts is not used. Then inorganic fillers, carbon black, oxides and hydroxides of the I and II Group metals are added. This step is generally carried out using a closed mixer.

In the preferred embodiment, the "onium" salt used as accelerator is selected between phosphonium quaternary salts containing at least one phosphorus atom linked by four covalent bonds to four organic radicals, said organic radicals containing from 1 to 30 carbon atoms, preferably from 2 to 8, the anion being a halide. The organic radicals can be linear, branched and cyclic possibly containing aromatic unsaturation. Triphenylbenzylphosphonium chloride and tetrabutyl phosphonium chloride are the preferred ones.

The accelerators are disclosed for example in U.S. Pat. No. 4,259,463 (aminophosphonium) and U.S. Pat. No. 3,712,877 (quaternary phosphonium salts).

In the preferred embodiment of the present invention, the crosslinking agents are chemical compounds having general formula HO-phenyl-R-phenyl-OH wherein the phenyl radical can be substituted in different ways and R can have from 1 to 9 carbon atoms and wherein hydrogen atoms can be partially or totally substituted by fluorine atoms. Bisphenol A and bisphenol AF are the preferred crosslinking agents.

Besides chemical compounds having two hydroxyl radicals, different kinds of amines, aliphatic and cycloaliphatic diamines, can be used such as butylamine, dibutylamine, piperidine; normally hexamethylenediamine carbamate and N,N'-dicinamilidene-1,6-hexanediamine are utilized.

It is necessary to remark the different characteristics and then the different reactivity of the cross-links bonding two macromolecular chains, due to the use of different vulcanization system. When an ionic vulcanization system, for example bisphenol, is used, the junction of the elastic network consists of an unit $C_p$—O-Ar-O—$C_p$, while using a vulcanization system with peroxides the junction of the elastic network consists of an unit $C_p$—C—X—C—$C_p$, where $C_p$ means carbon atoms being parts of two different polymer chains, Ar is an aromatic radical, possibly consisting of several aromatic radicals linked each other, for example by methylene groups, possibly substituted, and X is a polyfunctional radical, possibly containing heteroatoms.

Actually bisphenols are the most used vulcanizing agents; their use goes back to the '60s, and in a progressive way they replaced amine based systems for the reason that bisphenols show several advantages related both to the compounds preparation and the properties of the vulcanized material, particularly the thermal stability of the elastic network; as said before, bisphenol AF [2,2-bis(4-hydroxyphenyl) hexafluoropropane] is the most used polyphenol, while other polyphenols, as substituted hydroquinone and 4,4-di-substituted bisphenol are used only for selected applications.

The cross-links are produced during the vulcanization process according to a three step mechanism: a) a first step consisting in a double carbon-carbon bond formation due to HF elimination; b) a carbon carbon double bond rearrangement; c) a nucleofilic addition of the bisphenolate anion to the double bond. The vulcanizing agents, mainly bisphenol A, require accelerators to increase the reaction time.

In more details, the repeated de-hydrofluorination reactions occur at a group as HFP/VDF/HFP, followed by formation, according to an isomerisation mechanism, of a diene system capable of a nucleophilic attack by the bisphenolate anion. The active parts of this complex mechanism are the strong bases $R_4P^+$—OArOH or $R_4N^+$—OArOH arising from the reaction of the ammonium or phosphonium quaternary salts with the phenoxide anions.

The mechanism regarding cross-links formation is reported by Schmiegel [(1978) Kaut Gum Kunst 31:137, and (1979) Angew. Makromol. Chem. 76/77:39], Logothetis [(1989) Progress in Polymer Science 14:251] and more recently by A. Taguet, B. Ameduri and B. Boutevin in Crosslinking of Vinylidene Fluoride-Containing Fluoropolymers [Adv. Polym. Sci. (2005) 184: 127-211].

All the above described fluoroelastomers (defined by standard ASTM D1418 as FKM and FFKM, FPM according to ISO 1629) belong to the so-called "thermosetting materials"; then the vulcanized materials cannot be reused due to the irreversible chemical links that ensure a good stability property to the elastic network.

Compression molding, injection molding, calendaring and extrusion molding are the usual techniques concerning fluoroelastomer processing. Particularly large scrap volumes are produced using the first three above described techniques, said scraps usually accounting for more than 30% by weight compared with the original material and more than 40% by weight deriving from the manufacture of small articles. Then a serious problem is the low processing yield that, considering the value of the fluororubbers and the accelerated compounds, negatively affects the article's final price.

Therefore people skilled in the art have the need to find a technology enabling them to reuse the vulcanized material inevitably produced along with the final article or reuse the material making up the article at the end of its life cycle, taking into consideration the high value of the fluoroelastomer and its complex manufacture. As regards the recovery of scraps deriving from processing accelerated compounds to give final vulcanized articles, the prior art teaches only a cryogenic grinding made by grinding said scraps at a temperature lower than the fluoroelastomer glass transition temperature, using liquid nitrogen for cooling the elastomeric material below its glass transition temperature. In the same way the fluoroelastomer final articles at the end of their use cycle can be reprocessed. By this way a very fine ground material, usually named "fine dust", is obtained. This material is generally added to virgin rubber for compound preparation in a quantity usually smaller than 30% by weight, depending on the required final characteristics of the vulcanized article. However it is well known that the presence of said "fine dust", replacing part of the virgin rubber, makes the mechanical properties of the vulcanized article worse compared with those of a compound prepared using only virgin rubber; this is due to the fact that the "fine dust" acts as filler, disconnected to the rubber network.

The prior art does not provide documents or teachings about a fast devulcanization of vulcanized fluoroelastomers to produce devulcanized fluoropolymers still partially or totally reusable for preparing compounds suitable for manufacturing final articles having technological properties in accordance with different applications.

The object of the present invention is to provide a process for devulcanizing vulcanized fluoroelastomers enabling to address the elastic network breaking towards the vulcanization links, taking advantage of their lower chemical resistance, at the same time totally or partially minimizing the breaking reactions of the fluoropolymer chains.

Different technologies have been used for obtaining elastomeric materials reusable by mixing with virgin rubber, starting from vulcanized rubbers. Typical examples of said vulcanized rubbers are styrene butadiene copolymers (SBR), ethylene-propylene-diene copolymers (EPDM), ethylene-propylene copolymers (EPR), acrylonitrile-butadiene copolymers (NBR) and vulcanized silicone rubbers.

For example U.S. Pat. Nos. 5,284,625 and 5,258,413 (Isayev) disclose ultrasound generators placed on the top of an extruder, a vulcanized elastomer being forced to go through it; this process enables the de-vulcanization of the vulcanized material. Said devulcanized material, added in a quantity not greater than 20-30% by weight compared with virgin material, can be vulcanized to produce technical articles having good properties. When ultrasounds are used, the elastic network of the vulcanized elastomeric material is submitted to a stress equal to a mechanical traction able to bring about its breaking at statistic points. By consequence a degradation not addressed to the cross-links produced by vulcanization happens; then this process greatly modifies the structure of the original polymer and the final product is more similar to a micro gel rather than to the essentially linear polymer of the starting material.

DETAILED DESCRIPTION OF EMBODIMENTS OF THE INVENTION

The present invention intends to solve the above described problems by means of a process for devulcanizing vulcanized fluoroelastomers, said process being addressed to the vulcanization sites, so obtaining reclaimed fluoropolymers having a molecular weight enough high to be reused for preparing compounds suitable, after vulcanization, for producing fluororubbers endowed with excellent mechanical properties.

Usually the vulcanized fluoroelastomers consist of polymeric saturated chains, thermally very stable, linked by cross-links that, in particular conditions, can be submitted to very selective chemical reactions; in other words cross-links of these vulcanized fluoroelastomers can be selectively broken so reclaiming fluoropolymers having the original characteristics.

As described above, when bisphenol or amines having different structure are used as vulcanizing agents, the vulcanization mechanism provides for the dehydrofluorination at selected positions of the polymer chain followed by a nucleophilic reaction from the phenolate anion (Michael reaction) or the amine.

This complex mechanism of dehydrofluorination and subsequent Michael reaction is carried out by heating; usually the vulcanization reaction is carried out at 180° C. for about 10', at a pressure of at least 110 kPa, followed a subsequent post-curing step in a stove at a temperature of 230° C. for at least 24 hours.

Usually the quantity of the reagents, in particular with reference to oxides and hydroxides of Group I or II metals, preferably Ca and Mg, quaternary ammonium salts and bisphenol, is high as disclosed in Table 1 that reports, as non-limitative example, a formulation suitable for producing elastic seal articles made by vulcanized FKM. Fluoroelastomers vulcanized by ionic systems are used in many different applications, then different mechanical characteristics and resistance both to chemicals and to solvents are required. These different applications are not due to a different kind of cross-links, but only to their number, said number defining the so-called cross-link density strictly correlated to the mechanical characteristics (both short-term and long-term) of the vulcanized fluoroelastomer.

It is also known that fluoroelastomers vulcanized by ionic systems show a poor chemical stability (the amine vulcanized articles show the lowest stability), particularly in aqueous solutions of strong bases. At adequately high temperatures and long times, the fluoroelastomers vulcanized by ionic systems give rise to an ageing process and a progressive loss of the initial properties. This ageing process, described for example by Susanta Mitraa et al. in "Chemical degradation of fluoroelastomer in an alkaline environment", Polymer Degradation and Stability 83 (2004) 195-206, consists in a simultaneous event of two reactions, one related to the cross-links hydrolysis, the other involving the polymer chain breaking. The simultaneousness of these two reactions, in the absence of a control of the devulcanization conditions, causes a decrease in the average number molecular weight and a broadening of the molecular weight distribution due to the formation of low molecular weight chains.

The present invention discloses operating conditions useful for maximizing the cross-link breaking reaction of vulcanized fluoroelastomers at the same time reducing or eliminating the secondary reactions causing a breaking of the fluoropolymer molecular chains.

According to that, the present invention relates to a process for devulcanizing vulcanized fluoroelastomers having a fluorine content between 64% and 73% by weight and vulcanized by ionic systems, preferably said ionic systems being selected from bisphenol A and bisphenol AF, i.e. 2,2-bis(4-hydroxyphenyl)hexafluoropropane, said process comprising a step of heating said vulcanized fluoroelastomers in the presence of a hydrolysis composition, wherein said hydrolysis composition consists of one or more chemical selected from water, water soluble alcohols, water soluble glycols and mixtures thereof, at a temperature from 350° C. to 430° C., preferably from 370° C. to 410° C.

The terms used in the present description "fluoroelastomer", "fluorocarbon polymer", "fluororubber" have the same meaning.

The ionic vulcanization systems have been described above; they consist in crosslinking agents selected between organic compounds having two hydroxyl groups and/or one or more amine group in presence or in absence of accelerator or co-operating agents of the vulcanization reaction.

In other words, the present invention does not include fluoroelastomers vulcanized by peroxide.

Ethanol is a typical example of water soluble alcohol, while ethylene glycol is a typical example of water soluble glycol. In the preferred embodiment of the present invention the hydrolysis composition is selected between water and water-alcohol mixtures, more preferably between water and water-ethanol mixtures. The quantity of the hydrolysis composition required for a controlled degradation depends on the system selected for the thermochemical processing of the vulcanized elastomer and is strictly connected to the heating time of the fluoroelastomer. In other words, for the reason that the breaking of cross-links of vulcanized material is in competition with the dehydrofluorination that in turn precedes the molecular breaking reaction, it is very important to select by preliminary tests the right ratio between duration and temperature of the process, as well as the optimal ratio between vulcanized material and hydrolysis composition.

When the vulcanization is carried out in a pressure vessel where the vulcanized elastomer and the hydrolysis composition are loaded, water being the most preferred hydrolysis composition, the quantity of water is preferably between 0.2 and 100 grams per kilogram of vulcanized fluoroelastomer, more preferably from 0.5 to 50 grams per kilogram of vulcanized fluoroelastomer.

We have to stress that the quantity of water required to devulcanize vulcanized fluoroelastomer depends on the means selected for carrying out said devulcanization. It is evident that a closed system (such as a pressure vessel) allows a very good contact vapor/rubber also in presence of little water, while in an open system (such as a tape oven) the contact is not so efficient and the quantity of water is greater and variable depending on the contact time and the panel thickness. When a partially closed system (such as an extruder) is used, the vapor/rubber contact is better in comparison with that of a tape oven, but in this case some vapor is wasted. Then the water/rubber ratio disclosed in the experimental part refers to specific conditions of the tests; by consequence these experimental conditions cannot be used for predicting how to carry out the devulcanization using a different experimental set-up.

In any case the hydrolysis composition is added in a quantity sufficient to obtain a devulcanization minimizing the degradation reaction; in this case the molecular weight distribution analysis is the selected method to control the process and to optimize the characteristics of the devulcanized material.

As to the time necessary to carry out the vulcanization process according to the present invention, it is usually comprised between 1 and 40 minutes, preferably between 5 and 40 minutes, depending also on the technology selected for carrying out said process (see later in the experimental part). For example, using a two-screw extruder at 395-410° C., a four minutes residence time is sufficient, while using a punched tape oven good results are obtained at a temperature of 380-400° C. and a residence time of 20-40 minutes. The above described residence times are referred to roughly cut fluororubbers, for example having an average diameter between 1 and 15 mm, preferably between 3 and 10 mm. Greater particle size can cause an appreciable slowing down of the devulcanization, while smaller particle size can be obtained only by expensive processes.

It has to be noted that, when the hydrolysis composition consists of two or more chemical compounds and extruders or tape ovens are used, said chemical compounds can be fed separately or as a mixture.

The experimental part points out as the hydrolysis composition of the present invention can reduce the depolymerisation of the vulcanized material by means of a selective breaking of the cross-links, so enabling the production of reusable devulcanized material.

The devulcanized material yield is very high in comparison with the starting vulcanized material (see the experimental part), and a conversion degree almost quantitative can be obtained. Then the process of the present invention enables a user to reclaim in high conversion both the scraps deriving from processing vulcanized fluororubber and the final articles essentially made of vulcanized fluoroelastomers at the end of their life.

As said above, the process of the present invention can be carried out by using different pieces of equipments.

The mixture of vulcanized fluoroelastomer, ground in a coarse way, and hydrolysis composition (in a weight ratio as defined before) can be loaded in a pressure vessel that is heated to a selected temperature and for a selected period.

As an alternative, mono-screw or two-screw co- or counter-turning electrically heated extruders or other kinds of commercially available equipments can be used.

In a preferred embodiment of the present invention a two-screw extruder is used.

Compared with the mono-screw extruder, the two-screw extruder shows improved characteristics about the renewal of the contact surface rubber-wall and an improved control of the residence time inside the extruder.

The control of the residence time is important in order to avoid the formation of very degraded material. The self-cleaning screws can be very useful in order to minimize the quantity of material possibly present for too long time.

The two-screw extruder offers another advantage compared with the mono-screw extruder. The two-screw extruder allows an increase of the contact surface between rubber and vapor of the hydrolysis composition due to the continuous renovation of said surface. Moreover said two-screw extruder can be used also in presence of a partial filling and allows to control in an independent way the quantity of the feeding and the rotor speed. Different set-up can be checked in relation to the rubber to be devulcanized and to the desired devulcanization degree.

For example a two-screw extruder rotating from 50 to 500 r.p.m. and having a length/diameter ratio from 25 to 50 enables a user, at temperatures from 350° C. to 410° C., to obtain a shear stress low enough not to modify molecular weight distribution due to mechanically caused molecular breaking. The screw extruder set-up comprises units forming the feeding area, the compression area and the dosage area kept at a predefined temperature, and heated by electric resistances. A degassing area and final transport means where the material is partially cooled are also present. In any case, once fixed the temperature or the temperatures along the extruder axis, the optimal rotation condition depends on the extruder geometry. The overall size of the extruder, particularly length, form of the screws, geometrical set-up and applied power correlated to the quantity of the material to be worked, is well known; see for example Reactive Extrusion Principles and Practice, Ed. Marino Xanthos, Polymer Processing Institute at Steven Institute of Technology, 1992, (ISBN 3-446-15677 Carl Hanser Verlag, Munich, ISBN 0-19-520951-6 Oxford University Press N.Y., and bibliographic references thereof.

The process of the present invention enables to obtain devulcanized materials having a molecular weight distribution similar to that of the starting vulcanized fluoroelastomer, suitable for preparing technical compounds in a quantity from 5% and 100% by weight compared with the total elastomeric material, preferably from 5% to 70% by weight, the possible complement to 100% consisting of a virgin elastomer having a Mooney viscosity from 10 to 60, according to the required characteristics of the final article.

However the devulcanized fluoroelastomer obtainable by the above described process shows two main differences as compared with the initial vulcanized fluoroelastomer.

The devulcanized fluoroelastomer contains some olefin carbon-carbon unsaturation not present in the starting vulcanized fluoroelastomer. The total unsaturation is checked by measuring the iodine number, later described in the experimental part, which is in the range from 3 to 50, preferably from 4.2 to 13.

Moreover the devulcanized material from the process of the present invention shows a portion of fluoropolymers having a low molecular weight, said molecular weight being lower than 20 kDalton, usually from 5 kDalton to 15 kDalton, in a quantity between 5 and 20% by weight compared to its sum with the fluoropolymer having higher molecular weight.

Then it is a further object of the present invention a fluoroelastomer devulcanized composition having fluorine content between 64% and 73% obtainable according to the process of the present invention, characterised in that it consists of a mixture of:

a) a first fluoroelastomer having
   an average weight molecular weight (Mw) between 120 kDalton and 20 kDalton;
   a polydispersity index, defined as the ratio between the average weight molecular weight and the average number molecular weight (Mn) I=Mw/Mn between 1.8 and 3; and b) a second fluoroelastomer having
   a molecular weight lower than 20 kDalton, preferably between 5 kDalton and 15 kDalton;
   the weight % of polymer (a) as regards the sum (a)+(b) being between 95% and 80%, preferably between 90% and 85%;
   said fluoroelastomer devulcanized composition being further characterised by an iodine number from 3 to 50, preferably from 4.2 to 13.

As said above, the fluoroelastomer devulcanized composition obtainable by the process of the present invention can be useful for the preparation of compounds. The presence of the low molecular weight portion in the above described quantity is not a drawback; on the contrary it increases the compound workability without damaging the mechanical properties; particularly this low molecular weight portion greatly assists the extrusion, especially the extrusion speed, and the surface uniformity of the extruded material.

It has to be pointed out that the fluoroelastomer composition of the present invention again contains some non-hydrolizable residues initially present in the vulcanized material, particularly carbon black and alkaline-earth metal oxides. By consequence it is possible to reduce the quantity of said chemicals in the fluoroelastomer formulation prepared by using the fluoroelastomer composition of the present invention. Surprisingly, it has been found (see the experimental part) that the vulcanization of compounds prepared by using devulcanized fluoroelastomer, possibly mixed with virgin fluoroelastomer, needs a lower quantity of accelerator (particularly triphenylbenzylphosphonium chloride), also in presence of the same quantity of curing agent. In fact (see Table 8) the curing agent can be used in a quantity as low as 0.15 phr, whereas usually it is present in a quantity of 0.6 phr. This allows a marked economic advantage to be added to the advantage due to the reuse of fillers and alkaline and alkaline-earth metal hydroxides still present in the devulcanized material.

The devulcanized elastomeric fluorinated composition of the present invention can be used for the preparation of compounds and related vulcanized materials in presence of curing and accelerating agents.

We claim also the use of the above described devulcanized fluoroelastomer composition for the preparation of accelerated compounds and vulcanized materials thereof in the presence of:

(i) a crosslinking agent selected in the group consisting of chemicals having general formula HO-phenyl-R-phenyl-OH wherein the phenyl group can be in different way substituted by alkyl radicals and R can have from 1 to 9 carbon atoms and wherein the hydrogen atoms can be partially or totally substituted by fluorine atoms, the preferred crosslinking agent being selected between bisphenol A and bisphenol AF; said crosslinking agent being used in a quantity from 0.5 to 4 phr (parts per hundred rubber), preferably from 1 to 2 phr;

(ii) an accelerator, preferably selected in the group consisting of quaternary phosphonium salts containing at least a phosphorous atom linked by four covalent bonds to four organic radicals, said organic radicals containing from 1 to 30, preferably from 2 to 8, carbon atoms the anion being an halide, said organic radicals being linear or branched or cyclic, possibly containing aromatic unsaturations, the preferred accelerating agents being selected between triphenylbenzyl phosphonium chloride and tetrabutyl phosphonium chloride, said accelerator (ii) being used in a quantity to give a ratio between crosslinking agent and accelerator between 2 and 30, preferably between 2 and 20, more preferably between 4.5 and 20.

The devulcanized fluoroelastomeric composition of the present invention obtainable by the process of the present invention can be used in mixture with virgin fluororubber for the preparation of different articles.

It is a further object of the present invention to provide an use of the devulcanized fluoroelastomer composition along with virgin fluoroelastomer, the weight ratio between the devulcanized fluoroelastomer composition and the virgin fluoroelastomer being from 95:5 to 5:95, preferably from 60:40 to 5:95, for the preparation of sheets, O-rings, gaskets, and articles obtainable, for example, by compression, injection molding, extrusion and calendaring.

Finally a further object of the present invention concerns sheets, O-rings, gaskets and articles obtainable starting from a mixture of the devulcanized fluoroelastomer composition and virgin fluoroelastomer, the weight ratio between said fluoroelastomers being from 95:5 to 5:95, preferably from 60:40 to 5:95.

The experimental examples describe the preparation and the evaluation of compounds prepared using virgin fluoroelastomer (as comparative), fluoroelastomer composition of the present invention and mixtures thereof.

The following examples are reported for a better comprehension of the present invention.

EXAMPLES

Examples 1-20 relate to tests made using a pressure vessel.
Examples 21-32 relate to tests made using a tape oven.
Examples 33-38 relate to tests made using a two-screw extruder.
Examples 39-46 relate to the preparation and evaluation of compounds prepared starting from virgin fluoroelastomer, devulcanized fluoroelastomer and related mixtures.

Analytical Procedures

Unsaturation Degree (Iodine Number)

The total unsaturation is determined by titration in a polar solvent (THF) by adding a Hanus solution (BrI solution) in an excess quantity, followed by the reaction with potassium iodide in order to transform the BrI excess in elemental iodine. Then the iodine concentration is measured by titration with sodium thiosulfate. The result is reported as quantity of iodine milligrams per 100 grams of polymer (iodine number). The referred standard methods are ASTM D1959-97 and DIN 53241.

Insoluble Fraction

The insoluble material fraction is determined as insoluble residue after extraction by a solvent. An amount of about 50 grams of thermally processed material was cut in small pieces, weighted on an analytical balance ($P_1$) and put in a weighted Soxhlet thimble ($P_2$), followed by extraction with 250 ml THF (tetrahydrofuran) during 6 hours. The thimble containing the residue after extraction was dried and weighted ($P_3$); every weighing was carried out with an approximation of 0.001 g. The quantity of the non-extractable material was indicated as "% insoluble" and quantified using the following correlation:

$$\% \text{ insoluble} = (P_3 - P_2) \times 100 / P_1 \qquad 1.$$

Molecular Weight Distribution (MWD)

The assessment of the molecular weight distribution (the average number molecular weight $M_n$ and the average weight molecular weight $M_w$) along with the related ratio (polydispersity index $I = M_w/M_n$) is carried out by gel permeation chromatography (GPC) also known as exclusion chromatography (SEC). The analysis is made using a pump Waters model 590, THF at 30° C., and a series of columns Ultrastyragel $10^3$, $10^4$, $10^5$ and $10^6$ Angstrom, and a refractive index detector RI HP 1047A. The molecular weight assessment was made according to the Universal Calibration method using the following values of the parameters of Mark-Houwink equation k=1.82 $10^{-4}$ and alpha=0.69 calculated by P. Maccone, M. Apostolo, Mocromolecules 2000, 33, 1656-1663.

Materials

The devulcanization tests were carried out starting from a homogeneous lot of industrial scraps resulting from processing a FKM compound having Mooney viscosity 22 vulcanized by Bisphenol AF and phosphonium salt, said scraps having the composition reported in Table 1.

TABLE 1

| Component | phr | % by weight |
|---|---|---|
| FKM viscosity Mooney 22 | 100 | 69.7% |
| MgO | 3 | 2.09 |
| Ca(OH)$_2$ | 6 | 4.18 |
| Carbon black N990 | 30 | 20.90 |
| Bisphenol AF | 1.9 | 1.32 |
| Phosphonium salt (triphenyl benzyl phosphonium chloride) | 0.6 | 0.42 |
| Wax | 2 | 1.39 |
| Total | 143.5 | 100 |
| Fraction of the vulcanized non-extractable by THF | | 27.3% |

The molecular weight distribution of the FKM rubber used in the examples was: $M_n$=74.3 kD, $M_w$=134.3 kD and $I=M_w/M_n$=1,807.

Examples 1-10

Out of the Invention (Absence of Hydrolysis Composition)

A stainless steel pressure vessel able to stand up to 200 atm. was used in these examples; it was heated by immersion in a bath of molten salts (KNO$_3$:NaNO$_2$:NaNO$_3$=53:40:7, melting temperature 140° C.), its temperature being measured by thermocouples and controlled by two electric resistances 2 kW each. The internal thermocouple, useful for checking the temperature of the rubber bulk, is located inside a proper compartment allowing, when the vessel is closed, a good contact with the rubber bulk. Gas-tight inlet and outlet valves allow removing air from the vessel by a sequence of vacuum-nitrogen operation. The inlet valve is a three-way valve that can be used for feeding reagents into the vessel before it is closed and heated. The vessel is loaded with 500 g. vulcanized FKM rubber having the composition reported in Table 1 and ground in a coarse way. Then the vessel is closed and immersed in the bath of molten salts. Some preliminary tests were made in order to evaluate the time necessary for heating rubber to the selected temperature and the temperature necessary for heating the bath of molten salts. 500 gr. of vulcanized FKM having the composition reported in Table 1 were processed at different times and different temperatures as reported in Table 2. The times in Table 2 refer to the effective residence times within the reported range of temperatures, then excluding the time necessary for heating to the selected temperatures. At the end of the test, the vessel was taken out the bath of molten salts and quenched in water. The material is collected and analysed: the insoluble fraction, the unsaturation degree and the molecular weight distribution of the part soluble in THF were determined

TABLE 2

| Ex. | T (° C.) | Time (min) | % weight Insoluble | % weight insoluble adjusted | Iodine number | <15 kD % | $M_w$ | $M_w/M_n$ |
|---|---|---|---|---|---|---|---|---|
| 1 | 310-320 | 20 | 100 | 100 | — | — | nd | nd |
| 2 | 340-350 | 20 | 100 | 100 | — | — | nd | nd |
| 3 | 370-380 | 20 | 81 | 53.7 | 5.8 | 5 | 65.3 | 2.21 |
| 4 | 400-410 | 20 | 41 | 13.7 | 8.8 | 18 | 45.4 | |
| 5 | 420-430 | 20 | 34 | 6.7 | 8.9 | 25 | 37.8 | 2.35 |
| 6 | 370-380 | 30 | 75 | 47.7 | 6.7 | 6 | 57.7 | 2.28 |
| 7 | 400-410 | 30 | 38 | 10.7 | 9.5 | 25 | 39.4 | 2.35 |
| 8 | 420-430 | 30 | 31 | 3.7 | 10.9 | 32 | 32.3 | 2.42 |
| 9 | 370-380 | 40 | 60 | 32.7 | 9.2 | 14 | 48.3 | 2.32 |
| 10 | 400-410 | 40 | 31 | 3.7 | 12.1 | 30 | 25.6 | 2.37 |

Notes to Tables 2-7

Column 4 reports the values of the insoluble part (determined by extraction) of the devulcanized material, said insoluble part containing 27.3% by weight of non-extractable material, mainly consisting of alkaline-earth metal oxides and carbon black.

Column 5 reports the value "% weight insoluble adjusted": % insoluble adjusted=% insoluble−% initially insoluble.

Column 6 reports the iodine number referred to the overall soluble fraction.

Column 7 reports the weight percent of the low molecular weight portion <15 kD, as determined by GPC analysis. The $M_w$ and $M_w/M_n$ reported values (columns 8 and 9) are referred to the main pack, then excluding the low molecular weight portion.

Examples 11-20

In Presence of Water

These examples were carried out using the same vessel and the same procedure as in examples 1-10.

15 g H$_2$O were charged inside the pressure vessel, after air removing by many cycles vacuum-nitrogen, so obtaining a quantity of water of 3 g. per 100 g. of vulcanized elastomer. Table 3 reports the experimental parameters.

The devulcanized material was collected after taking the vessel out the bath of molten salts and quenching in water. The material was analysed: the insoluble fraction, the unsaturation degree and the molecular weight distribution of the part soluble in THF were determined (Table 3).

TABLE 3

| Ex. | T (° C.) | Time (min) | % weight Insoluble | % weight insoluble adjusted | Iodine number | <15 kD % | $M_w$ | $M_w/M_n$ |
|---|---|---|---|---|---|---|---|---|
| 11 | 310-320 | 20 | 100 | 100 | — | — | — | — |
| 12 | 340-350 | 20 | 90 | 62.7 | 4.2 | 5 | 110.2 | 1.95 |
| 13 | 370-380 | 20 | 75 | 47.7 | 6.2 | 7 | 105.7 | 2.01 |
| 14 | 400-410 | 20 | 38 | 10.7 | 6.9 | 10 | 95.3 | 2.08 |
| 15 | 420-430 | 20 | 32 | 4.7 | 8.1 | 13 | 85.6 | 2.17 |
| 16 | 370-380 | 30 | 60 | 32.7 | 5.8 | 7 | 98.5 | 2.09 |
| 17 | 400-410 | 30 | 34 | 6.3 | 9.3 | 11 | 83.1 | 2.20 |
| 18 | 420-430 | 30 | 31 | 3.7 | 10.6 | 13 | 62.6 | 2.23 |
| 19 | 370-380 | 40 | 45 | 17.7 | 7.7 | 11 | 74.2 | 2.27 |
| 20 | 400-410 | 40 | 31 | 3.3 | 10.8 | 15 | 55.3 | 2.31 |

Comments to Examples 1-20

Table 2 (comparative examples 1-10) clearly shows that both increasing temperature and heating time cause a progressive increase in the percent of soluble portion. The insoluble portion is a residue consisting of the whole inorganic fillers in addition to carbon black and some organic material, probable a gel, deriving by thermal degradation of the polymer. Moreover GPC analysis points out that both increasing temperature and heating time give rise to an increase of the polydispersity index $M_w/M_n$ and to a decrease of M.

The presence of water (examples 11-20 according to the present invention) reduces the quantity of the insoluble portion at lower temperatures in comparison with comparative examples 1-10. Moreover the $M_w$ value is maintained at higher values compared with treatments made at similar temperature and time processing, but without water (see comparative examples 1-10 in comparison with examples 11-20 of the present invention).

Furthermore in presence of water also the molecular weight dispersion is, at the same conditions, always lower. It is obvious that together with the devulcanization reaction, a thermally induced reaction causing the degradation of the polymer chain is active; in presence of water the devulcanization reaction is more efficient than the thermal degradation reaction so, at the same conditions, the average weight molecular weight is greater and the polydispersity index is lower. The unsaturation degree, measured by the iodine number, shows that along with the devulcanization reaction, a partial, even very low, dehydrofluorination reaction is working.

Examples 21-26

Out of the Invention

These tests were carried out using a tape oven having 1 mm diameter holes, electrically heated by electric resistances placed at a variable and modifiable distance between 5 and 25 cm from a panel of ground and sieved (particle size from 0.2 to 0.3 cm) FKM rubber having a thickness from 0.5 to 1.0 cm.

The processing parameters were modified in order to have a residence time under the resistances as reported by Table 4. The temperature inside the panel was measured by a thermocouple placed inside the rubber panel but straight away outside the area irradiated by the resistances.

The quantity of the processed rubber ranges between 500 and 1500 g/hour in relation to the tape velocity and the panel thickness.

TABLE 4

| Ex. | Time min. | T (° C.) | % weight insoluble | % weight Insoluble adjusted | Iodine number | <15 kD % | Mw | Mw/Mn |
|---|---|---|---|---|---|---|---|---|
| 21 | 20 | 380-390 | 79 | 51.7 | 8.6 | 12 | 67 | 2.19 |
| 22 | 30 | 380-390 | 73 | 45.7 | 10.1 | 18 | 59 | 2.29 |
| 23 | 40 | 380-390 | 55 | 27.7 | 9.2 | 15 | 52 | 2.33 |
| 24 | 20 | 390-400 | 55 | 27.7 | 11.3 | 25 | 46 | 2.32 |
| 25 | 30 | 390-400 | 39 | 11.7 | 11.9 | 22 | 40 | 2.34 |
| 26 | 40 | 390-400 | 33 | 5.7 | 13.1 | 28 | 29 | 2.39 |

Examples 27-32

At the same conditions as in examples 21-26, a flow of about 120-150 l/h heated air to which water was added by means of a micro-pump (300-600 g/h), said water immediately vaporizing so ensuring a residual partial tension of steam on the FKM bed, was fed through the bored tape.

The results are reported in Table 5.

TABLE 5

| Ex. | Time min. | T (° C.) | % weight insoluble | % weight Insoluble adjusted | Iodine number | <15 kD % | Mw | Mw/Mn |
|---|---|---|---|---|---|---|---|---|
| 27 | 20 | 380-390 | 75 | 47.7 | 6.6 | 9 | 87.5 | 2.03 |
| 28 | 30 | 380-390 | 38 | 10.7 | 7.8 | 14 | 81.7 | 2.08 |
| 29 | 40 | 380-390 | 32 | 4.7 | 8.1 | 12 | 70.4 | 2.15 |
| 30 | 20 | 390-400 | 45 | 17.7 | 8.9 | 18 | 72.9 | 2.05 |
| 31 | 30 | 390-400 | 33 | 5.7 | 9.4 | 18 | 66.6 | 2.15 |
| 32 | 40 | 390-400 | 31 | 3.7 | 10.9 | 22 | 62.3 | 2.29 |

Comments to Examples 21-32

The presence of water (examples 27-32) enables, at the same temperature, a lower degradation and a preservation of the molecular weight at sufficiently high values; on the other hand the absence of water (comparative examples 21-26) produces a fall in the average weight molecular weight and an increase in the index $M_w/M_n$.

Examples 33-38

Two-screw Extruder

Scraps from processing vulcanized fluorocarbon elastomer, obtained starting from the accelerated compound having the composition reported in Table 1, were coarsely ground (average particle size from 0.3 to 0.8 cm) and fed to a two-screw co-rotating extruder having a 35 mm diameter, a ratio length/diameter equal to 45 (TE-35 Coperion Keya Machinery Co. Ltd.) and a rotating speed of 310 r.p.m. The quantity of the feeding material is so adjusted to allow a 5'+1' residence time of the material inside the extruder. The temperature immediately under the feeding area (compression and mixing area) was adjusted by electric heating. Table 6, column 3, reports the average temperature (the fluctuation of the temperature is about +2° C.) of the material in the central part of the extruder. After a possible degassing, the material was partially cooled in the final part of the extruder. The addition of water-alcohol mixture (Table 6, column 2) was made by means of a couple of parallel measuring out micro pumps Gilson 305 normally used for HPLC, the injection being carried out in the feeding area. The extruded 50×10 mm plate-shaped material was cooled into water. Table 6 reports the results of these tests.

Examples 33, 35 and 37 are comparative, being out of the invention (no hydrolysis composition).

TABLE 6

| Ex. | Feeding $H_2O$/ETOH (1:1), ml/h | T (° C.) | % weight insoluble | % weight Insoluble adjusted | Iodine number | <15 kD, % weight | Mw | Mw/Mn |
|---|---|---|---|---|---|---|---|---|
| 33c | — | 380 | 65 | 37.7 | 5.9 | 10 | 106.3 | 2.13 |
| 34 | 400 | 380 | 40 | 12.7 | 5.5 | 8 | 99.5 | 2.08 |
| 35c | — | 395 | 42 | 14.7 | 6.9 | 12 | 84.7 | 2.25 |
| 36 | 400 | 395 | 35 | 7.7 | 6.2 | 10 | 96.5 | 2.15 |
| 37c | — | 410 | 33 | 5.7 | 9.9 | 17 | 75.3 | 2.30 |
| 38 | 400 | 410 | 31 | 3.7 | 9.5 | 14 | 84.2 | 2.19 |

Comments to Table 6

Temperatures in the range 390° C.-400° C. enable to maintain the molecular weight at values similar to those of the vulcanized material. The use of a 400 ml/h mixture $H_2O$/ethyl alcohol (1:1 by volume) allows a better maintenance of the molecular weight and a reduced quantity of the low molecular weight portion. Increasing the temperature up to 410° C. brings on a low degradation of the molecular chain and, by consequence, a decrease of the molecular weight and an increase of the polydispersity index.

In any case these tests confirm that the addition of a hydrolysis composition (Ex. 34, 36, 38), at the same temperature, gives rise to a lower $M_w/M_n$ decrease and a lower content of <15 kD products, in comparison with tests carried out without said hydrolysis composition (Ex. 33c, 35c, 37c).

Example 39

Separation by Fractional Precipitation

The devulcanized elastomer obtained according to example 38 is fractionated according to a well-known way. At the end of the extraction the solution, containing about 35 g of soluble material, is transferred into a 5 liter flask equipped with a mixer and further diluted with 2000 ml THF; the solution temperature is fixed to 15° C. using a thermostatic bath. Then methyl alcohol is added in a quantity so as to produce a light but visible and persistent turbidity of the solution. Then, again by using the thermostatic bath, the solution is brought back to 25° C. until the turbidity disappears. The solution rests and the bath temperature is fixed at 15° C. After at least 12 hours, a solution containing a portion of the polymer is taken from the bottom of the flask. The molecular weight distribution and the iodine number of said portion of polymer were determined Table 7 reports the results of the analysis concerning some of the 8 fractions in which the material was partitioned.

TABLE 7

| Fraction n° | % weight | Mn | Iodine number |
|---|---|---|---|
| 2 | 5 | 8.2 | 13 |
| 4 | 12 | 23 | 11 |
| 6 | 30 | 32 | 7 |
| 8 | 33 | 54 | 5 |

Comments to Table 7

The quantity of unsaturated carbon carbon bonds is basically unchanged increasing the molecular weight of the fraction.

Preparation of Compounds Using Reclaimed Material from Example 38.

Some tests carried out by the Applicant show that compounds manufactured by using reclaimed material according to the above examples, possibly added with virgin elastomer, have such characteristic that they can overcome most of tests required for this kind of elastomer as ASTM D2000 or for car industry as DBL 6038 or vW 2.8.1. or for aeronautical industry.

The formulation of the compound must take care that the reclaimed product also contains carbon black as filler, and different inorganic materials, their quantity being easily determined using thermogravimetric analysis.

Here below are reported some examples of compound formulations prepared using the devulcanized elastomer obtained according example 38, said material being named as "reclaimed".

In order to obtain the required properties, the formulation to be vulcanized also comprises:

1. an acceptor of inorganic acid selected from those known and usually used for vulcanizing fluoroelastomer in a quantity between 1 and 10 parts per 100 parts of elastomer (p.h.r.);

2. a chemical compound selected from those used for the ionic vulcanization of fluorocarbon elastomers in a quantity between 0.5 and 10 parts per 100 parts of fluorocarbon elastomer;

3. a polyphenol and an accelerator, in the preferred embodiment the first one consisting of bisphenol AF and the second one triphenylphosphonium chloride in a ratio from 4.0 to 20.0, preferably between 4.5 and 15.0.

It is known that the usual acid acceptor is selected from Mg, Ca, Sr, Ba, Zn, Ti, oxides, preferably MgO, while the basic chemical compound is usually selected from Ca, Sr, Ba, metal salt of weak acid, as carbonate, benzoate, oxalate or Ca, Sr, Ba, Na, K phosphite and mixture thereof, preferably $Ca(OH)_2$ is used.

The compound composition can comprise other components known as fillers, for example carbon black and silica, usually comprised in the range between 5 and 30 parts per 100 parts of virgin elastomer.

Example 39

Preparation of the Reference Compound a (100% Virgin Polymer)

The virgin fluorocarbon elastomer is a commercial copolymer vinylidene fluoride hexafluoropropene (60:40; fluorine content: 66% by weight) having a Mooney viscosity ($M_L$(1+4) at 100° C.) of 22. The fluorocarbon elastomer is mixed with MgO, $Ca(OH)_2$, carbon black MT 990 and $Ba(SO_4)$, the related quantities being reported in the first column of Table 8. The quantity of the ingredients is indicated, as in the rubber industry, in phr (per hundred rubber), let say the quantity of every component referred to 100 parts of rubber. The composition is prepared in a 1.6 liter closed mixer having the rollers cooled by water. Then the compound is unloaded and afterwards homogenized in an open mixer, also in this case the rollers being cooled by water circulation, in which the vulcanizing system consisting of an accelerator (triphenyl benzyl phosphonium chloride) and a crosslinking agent (bisphenol AF) is added. The compound is processed to prepare a foil having dimensions 200×200×2 and, placed in a heated press, vulcanized at 170° C. for 10 min. under a pressure of 110 kPa. The following post-vulcanization step is carried out in a stove at 230° C. for 24 hours. Results related to viscosity mechanical properties of the final compounds are reported in Table 8.

Example 40

Preparation of the Reference Compound B (100% Reclaimed Polymer)

The reclaimed material prepared as described un Example 38 is mixed with Mg oxide and Ca hydroxide, carbon black MT 990 and Barium sulphate, in addition to some additives consisting of carnauba wax and Struktol WS 280, the quantity of every ingredient being reported in the second column of Table 8. For the calculation of the reclaimed rubber quantity (135 phr) it is necessary to consider the non-rubber products contained in the reclaimed rubber. The composition is prepared in a 1.6 liter closed mixer having the rollers cooled by water. Then the compound is unloaded and afterwards homogenized in an open mixer, also in this case the rollers being cooled by water circulation, in which the vulcanizing system consisting of an accelerator (triphenyl benzyl phosphonium chloride) and a crosslinking agent (bisphenol AF) is added. The compound is processed to prepare a foil having dimensions 200×200×2 and, placed in a heated press, vulcanized at 170° C. for 10 min. under a pressure of 110 kPa. The following post-vulcanization step is carried out in a stove at 230° C. for 24 hours. Results related to the viscosity and the mechanical properties of the final compounds are reported in Table 8.

Examples 41-45

Preparation of Compounds C, D, E, F, G Containing Both Reclaimed and Virgin Polymer 70 phr of reclaimed polymer are mixed with 140 g. of compound A; other changes in the recipe are reported in Table 8.

Example 46

Preparation of the Reference Compound H

A compound according to specifications ASTM D2000 M2 HK608 A1-10 B38 EF 31 EO78 is manufactured. Then this compound can be used as reference to compound F (see Table 9).

Example 47

Preparation of the Reference Compound I (100% Reclaimed Polymer, Bisphenol AF/Accelerator Ratio=12.6)

According to the procedure reported in Example 40, a compound consisting of 100% reclaimed polymer having a different content of accelerator (0.15 phr), the same quantity of Bisphenol AF (1.9 phr), a lower content of acid acceptor (MgO, 1 phr) and a lower quantity of a base (Ca(OH)$_2$, 5 phr), is prepared.

TABLE 8

| | A | B | C | D | E | F | G | H | I |
|---|---|---|---|---|---|---|---|---|---|
| Compound Compositions | | | | | | | | | |
| Virgin fluoroelastomer | 97.5 | — | — | — | — | — | — | 98.1 | — |
| Compound formulated as A | — | — | 140 | 140 | 140 | 140 | 140 | — | — |
| Reclaimed from ex. 40 | — | 135 | 70 | 70 | 70 | 70 | 70 | — | 135 |
| Accelerator | 0.6 | 0.6 | 0.25 | 0.15 | 0.1 | 0.0 | 0.1 | 0.4 | 0.15 |
| Bisphenol AF | 1.9 | 1.9 | 1 | 0.65 | 0.35 | 0.0 | 0.9 | 1.5 | 1.9 |
| MgO | 3 | 3 | 1 | 1 | 1 | 1 | 1 | 3 | 1 |
| Ca(OH)$_2$ | 6 | 6 | 3 | 3 | 3 | 3 | 3 | 6 | 5 |
| MT 990 | 30 | — | — | — | — | — | — | 15 | — |
| Mechanical properties after vulcanization, 170° C. for 10', 110 kPa, post-vulcanization at 230° C. for 24 h. | | | | | | | | | |
| Tensile strength MPa | 10.5 | 11.5 | 13 | 11.5 | 10.5 | 9.5 | 11 | 9 | 12.5 |
| Elongation at break % | 200 | 60 | 95 | 150 | 230 | 330 | 175 | 250 | 155 |
| Compression set 24 h at 200° C. | 17 | 21 | 17 | 20 | 25 | 32 | 19 | 28 | 21 |
| Hardness Shore A | 75 | 72 | 74 | 71 | 65 | 59 | 71 | 60 | 70 |

Comments to Table 8

1. Compound B vs. compound A; using 100% reclaimed rubber (compound B) causes an increase of the tensile strength and a large decrease of the elongation at break compared with Compound A (100% virgin rubber).
2. Compound I vs. compound B; the decrease of the accelerator quantity and the use of ratio Bisphenol/accelerator >12 brings again to acceptable values of tensile strength, elongation at break, compression set and hardness.
3. Compound C vs. compound A; the addition of reclaimed product causes an increase of tensile strength and a decrease of at least 50% the elongation, in spite of the large reduction of the quantity of the crosslinking-accelerator composition. Unexpectedly the compression set increases. Considering that the reclaimed product has a $M_n$ lower than virgin polymer and a greater low molecular weight fraction, a lower breaking and a larger compression set should be expected.
4. Compound D vs. compound A; a further quantity reduction of the vulcanizing/crosslinking system allows a recovery of the elongation at break and a Shore A decrease, along with good compression set values.
5. Compound E vs. compound A; a further reduction of quaternary salt and bisphenol causes an increase of elongation at break, but a deterioration of compression set and hardness.
6. Compound F vs. compound A; the addition of reclaimed rubber without adjustment of the vulcanizing system (only that previously present in the 140 phr of compound A) causes a high elongation at break, a decrease of the hardness and a worsening of the compression set; these data are in accordance with the addition of a polymer material having a lower molecular weight and containing a fraction of low molecular weight polymer.
7. Compound G vs. compound A; using bisphenol AF in the same quantity as that for virgin rubber but in presence of a quantity of quaternary salt lower than 80% produces a compound having a good tensile strength, with a small reduction in elongation at break, a similar compression set and lower hardness. This test shows that, unexpectedly, the reclaimed product also contains a significant part of active quaternary salt while bisphenol (crosslinking agent) seems to be almost completely consumed.

Technological Evaluation

The vulcanized materials obtained starting from compounds A, G, H and F have been evaluated according to ASTM D2000 as O-ring and gasket. Results are reported in Table 9. These tests clearly show that compounds G and F containing about 50% by weight of reclaimed rubber have properties within the specifications and similar to those of compounds A and H, prepared by using only virgin rubber.

TABLE 9

|  | ASTM D2000 M6 HK710 A1-10 B38 EF31 EO78 Compound A | ASTM D2000 M6 HK710 A1-10 B38 EF31 EO78 Compound G | ASTM D2000 M2 HK608 A1-10 B38 EF31 EO78 Compound H | ASTM D2000 M2 HK608 A1-10 B38 EF31 EO78 Compound F |
|---|---|---|---|---|
| ShoreA | 74 | 71 | 60 | 60 |
| HK710 Tensile strenght >10 | 10.5 | 11 |  |  |
| HK608 Tensile strength >8 |  |  | 9 | 9.5 |
| HK710 Elong. at break >175% | 200 | 175 |  |  |
| HK608 Elong. at break >200% |  |  | 250 | 330 |
| HK710 C. set (24 h/200° C.) <20 | 12 | 14 |  |  |
| HK608 C. set (24 h/200° C.) <50 |  |  | 25 | 35 |
| A1-10 (70 h/250° C.) | | | | |
| Δ ShoreA 0 ÷ +10 | +2.5 | +2 | +2 | +1.5 |
| Δ Tensile strength (−25%) | +3 | +5 | +6 | +7 |
| Δ Elong. at break (−20%) | −5 | −8 | −5 | −8 |
| EF31 Fluid resistance, Test Method D 471, Reference Fuel C, 70 h at 23° C. | | | | |
| Δ Shore A ±5 | +1.5 | +2 | +2 | +3 |
| Δ Tensile strength (−25%) | −15 | −15 | −16 | −17 |
| Δ Elong. at break (−20%) | +5 | +5 | +10 | +11 |
| ΔVolume (0 ÷ +10) | +2.5 | +3 | +3 | +4 |
| EO78 Fluid resistance, Test Method D 471, Service LiquidB No. 101, 70 h at 200° C.: | | | | |
| Δ Shore A −15 ÷ +5 | −8 | −8 | −10 | −10 |
| Δ Tensile strength (−40%) | −23 | 25 | −25 | −26 |
| Δ Elong. at break (−20%) | −10 | −11 | −10 | −11 |
| ΔVolume (0 ÷ +15) | +10 | +12 | +12 | +13 |

The invention claimed is:

1. A process for devulcanizing vulcanized fluoroelastomers having a fluorine content between 64% and 73% by weight and vulcanized by ionic systems, said process comprising a step of:
   heating said vulcanized fluoroelastomers in presence of a hydrolysis composition, wherein said hydrolysis composition consists of one or more chemical selected from the group consisting of water, water soluble alcohols, water soluble glycols and mixtures thereof, at a temperature from 350° C. to 430° C.

2. The process according to claim 1, wherein the hydrolysis composition is selected from the group consisting of water and water-ethanol mixtures.

3. The process according to claim 1, wherein the temperature is from 370° C. to 410° C.

4. The process according to claim 1, wherein the process for devulcanizing is carried out using a two-screw extruder.

5. A fluoroelastomer devulcanized composition having fluorine content between 64% and 73% obtainable according to claim 1, wherein the composition consists of a mixture of:

a) a first fluoroelastomer having:
an average weight molecular weight (Mw) between 120 kDalton and 20 kDalton; and
a polydispersity index, defined as the ratio between the average weight molecular weight and the average number molecular weight (Mn) I=Mw/Mn between 1.8 and 3; and
b) a second fluoroelastomer having:
a molecular weight lower than 20 kDalton; and
the weight % of polymer (a) as regards the sum (a)+(b) being between 95% and 80%;
said fluoroelastomer devulcanized composition having an iodine number from 3 to 50.

6. A method of preparing accelerated compounds and vulcanized materials thereof, the method comprising:
providing a devulcanized fluoroelastomer composition according to claim 5; and
performing a reaction by providing:
(i) a crosslinking agent selected from the group consisting of chemicals having a general formula HO-phenyl-R-phenyl-OH, or HO-(alkyl radical)-R-phenyl-OH, wherein R has from 1 to 9 carbon atoms, wherein H indicates a hydrogen atom or a fluorine atom and wherein said crosslinking agent is used in a quantity from 0.5 to 4 phr (parts per hundred rubber), and;
(ii) an accelerator,
said accelerator (ii) being used in a quantity to give a ratio between crosslinking agent and accelerator between 2 and 30.

7. The method according to claim 6, further comprising a virgin fluoroelastomer, a weight ratio between the devulcanized fluoroelastomer composition and the virgin fluoroelastomer being from 95:5 to 5:95, and
preparing sheets, O-rings, gaskets, or articles by compression, injection molding, extrusion, or calendaring therewith.

8. Sheets, O-rings, gaskets or articles obtained starting from a mixture of a devulcanized fluoroelastomer composition according to claim 5 and a virgin fluoroelastomer,
wherein the sheets, O-rings, gaskets or article have a composition in which weight ratio between said devulcanized fluoroelastomer composition and the virgin fluoroelastomer is from 95:5 to 5:95.

9. The process according to claim 1, wherein said ionic systems are selected from the group consisting of bisphenol A and bisphenol AF (2,2-bis(4-hydroxyphenyl)hexafluoropropane).

10. The fluoroelastomer devulcanized composition according to claim 5, wherein the second fluoroelastomer has:
a molecular weight between 5 kDalton and 15 kDalton;
the weight % of polymer (a) as regards the sum (a)+(b) is between 90% and 85%; and
the fluoroelastomer devulcanized composition has an iodine number from 4.2 to 13.

11. The method according to claim 6, wherein the crosslinking agent is bisphenol A or bisphenol AF and is used in a quantity from 1 to 2 phr, and wherein the accelerator is selected in the group consisting of quaternary phosphonium salts containing at least a phosphorous atom linked by four covalent bonds to four organic radicals, said organic radicals containing from 1 to 30 carbon atoms, the anion being a halide, the organic radicals being linear or branched or cyclic.

12. The method according to claim 11, wherein the organic radicals contain from 2 to 8 carbon atoms, and wherein the accelerator (ii) is used in a quantity to provide a ratio between crosslinking agent and accelerator between 4.5 and 20.

13. The method according to claim 12, wherein the organic radicals contain aromatic unsaturation.

14. The method according to claim 11, wherein the accelerator is triphenylbenzyl phosphonium chloride or tetrabutyl phosphonium chloride.

15. The method according to claim 6, wherein the weight ratio between the devulcanized fluoroelastomer composition and virgin fluoroelastomer is from 60:40 to 5:95.

16. The sheets, O-rings, gaskets or articles according to claim 8, wherein the sheets, O-rings, gaskets or articles have a composition in which the weight ratio between the devulcanized fluoroelastomer composition and the virgin fluoroelastomer is from 60:40 to 5:95.

* * * * *